Patented Sept. 11, 1951

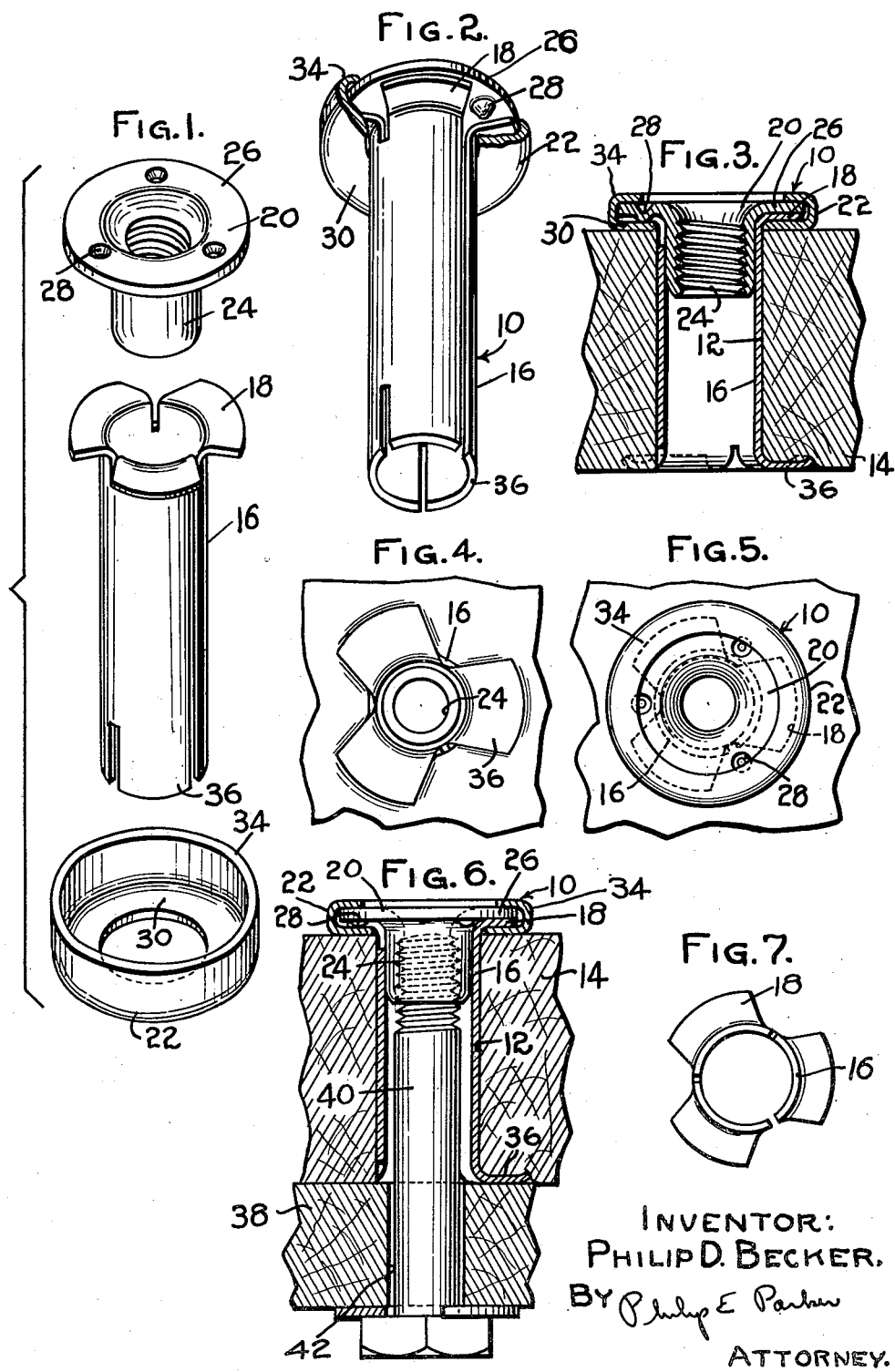

2,567,864

UNITED STATES PATENT OFFICE 2,567,864

FLANGED NUT ASSEMBLY

Philip D. Becker, Hingham, Mass., assignor to United-Carr Fastener Corporation, Cambridge, Mass., a corporation of Massachusetts Application April 19, 1949, Serial No. 88,417

1 Claim. (Cl. 151—33)

This invention relates generally to nut assemblies, and has particular reference to a nut assembly adapted to be assembled in a structural member to enable the member to be readily fastened to a similar member.

In the construction of certain parts of packing crates and similar devices, it has been found economical to assemble the various parts with nuts and bolts to allow the crate to be disassembled without damage to the individual parts so that they may be reused a great number of times. To accomplish this, a flanged nut is commonly provided on one of two members to be joined, which has an internally threaded shank seated in one end of an opening through the member, and a flange disposed about the shank and seated against the outer surface of the member. The flanged nut is adapted to engage a bolt inserted through the other member and into the opposite end of the opening to retain the members in assembly. During assembly of the members, it is frequently necessary to hammer the bolt through the openings, and as a result the flanged nut is often knocked out of the opening, or so tilted that it is impossible to screw the bolt into the nut.

The object of the invention is to provide a nut assembly for use in structural members to enable the members to be readily assembled and disassembled without damage to the members.

A further object of the invention is to provide a nut assembly which is adapted to be permanently assembled in structural members such as are used in shipping crates and similar devices.

A still further object of the invention is to provide a flanged nut assembly for use on joining wooden structural members, which has means for guiding a bolt into engagement with a threaded portion of the nut.

Other objects of the invention will, in part, be obvious, and will, in part, appear hereinafter. For a fuller understanding of the nature and objects of the invention, reference should be had to the following detailed description, taken in conjunction with the accompanying drawing, in which:

Fig. 1 is an exploded view in perspective of the component parts of the nut assembly of the invention;

Fig. 2 is a perspective view of the nut assembly with a portion of the retaining member cut away to show certain features of the invention;

Fig. 3 is a view in elevation, partly in section, of the nut assembly of the invention assembled in a structural member;

Fig. 4 is a bottom plan view of the assembly of Fig. 3;

Fig. 5 is a top plan view of the assembly of Fig. 3;

Fig. 6 is a view in elevation, partly in section, of a pair of structural members which have been fastened together by using the nut assembly of the invention; and Fig. 7 is a bottom plan view of the hollow tube member shown in Fig. 1.

Referring to the drawing, there is illustrated a nut assembly 10, which is adapted for assembly in an opening 12 through a structural member 14. The nut assembly 10 comprises a hollow tubular member 16, which in the preferred form has outwardly turned split end portions 18 at one end thereof, and a flanged nut 20 held in assembly with the tubular member by means of a retaining member 22. The hollow tubular member is preferably formed by rolling a piece of sheet metal into the form of a cylinder, and is of sufficient length to extend completely through the member 14. The flanged nut comprises a hollow internally threaded shank 24, and a flange 26 disposed about the shank at one end thereof. The shank 24 is assembled in the end of the tubular member so that the flange 26 is seated against the outwardly turned split end portions 18. To prevent appreciable rotation of the nut relative to the tubular member, a number of projections 28 are provided on the flange, which project outwardly between the split end portions. The retaining member 22 comprises a disc portion 30, having an opening 32 disposed centrally therein to receive the tubular member, and a peripheral flange engaging portion 34. The retaining member 22 is mounted on the tubular member 16 with the disc portion 30 seated against the outwardly turned split end portions 18, and the peripheral flange engaging portion 34 is curled over the outer edge of the flange to retain the flanged nut and the tubular member in assembly.

To provide means for permanently retaining the nut assembly in the opening in the structural member, the opposite end of the tubular member is slotted longitudinally to form engaging portions 36, which are adapted to be bent outwardly after the nut assembly is inserted into the opening 12, to engage the surface of the member 14 adjacent the opening.

Referring to Fig. 6 there is illustrated the method of fastening the structural member 14 to another structural member 38 by use of the nut assembly of the invention. A threaded bolt 40, which is disposed through an opening 42 in the member 38, is inserted into the tubular member 16 for engagement with the threaded shank 24, whereby tightening of the bolt in the shank causes the members 14 and 38 to be drawn securely together. As hereinbefore described, it is frequently necessary to hammer the bolt into the openings during assembly of the members. However, since the nut is securely held in the opening by the engaging members 36, the nut cannot be knocked out of the opening, and the tubular member provides support for the shank to prevent appreciable tilting or bending of the shank during such hammering. The tubular member also serves as a guide for the end of the bolt to facilitate engagement of the bolt with the shank.

Although in the preferred form of the device the tubular member is provided with split end portions for engagement by the retaining member, it will be understood that a continuous peripheral flange may be used in some cases.

Since certain other modifications may be made in the device of the invention, it is intended that all matter contained herein be interpreted in an illustrative, and not in a limiting sense.

I clam:

A nut assembly for use with an apertured support, said nut assembly comprising an elongated hollow tubular member adapted to extend through a support aperture and having outwardly turned split end portions at one end thereof, and split end portions at the other end adapted to be turned outwardly to engage the support after the sleeve is inserted through the aperture thereof, a flanged nut comprising a hollow shank of less length than the tubular member disposed in one end thereof and having an outwardly flanged end portion seated against said outwardly turned split end portions, said hollow shank having threads therein for engaging a bolt, said flanged end portion having raised portions thereon disposed between said split end portions to prevent appreciable rotation of the flanged nut relative to the tubular member, and a retaining member seated against the split end portions, said retaining member having an outer edge portion curled over the outer edge of said flanged end portion to retain the flanged nut and tubular member in assembly.

PHILIP D. BECKER.

REFERENCES CITED

The following references are of record in the file of this patent:

UNITED STATES PATENTS

| Number | Name | Date |
|---|---|---|
| 843,720 | Waddell | Feb. 12, 1907 |
| 1,368,222 | Foreman | Feb. 8, 1921 |
| 1,564,772 | Fisher | Dec. 8, 1925 |
| 1,570,148 | Herr | Jan. 19, 1926 |
| 1,832,098 | Cole | Nov. 17, 1931 |
| 1,873,894 | Kimbell | Aug. 23, 1932 |
| 1,919,940 | Hall | July 25, 1933 |
| 2,055,443 | Jones | Sept. 22, 1936 |
| 2,389,122 | Churchill | Nov. 20, 1945 |